United States Patent
Moses

[11] 3,981,208
[45] Sept. 21, 1976

[54] SHEET WINCH

[75] Inventor: Andrianus Moses, Voorschoten, Netherlands

[73] Assignee: Enkes N.V., Voorburg, Netherlands

[22] Filed: Oct. 15, 1974

[21] Appl. No.: 514,507

[30] Foreign Application Priority Data
May 29, 1974 Netherlands .................. 7407198

[52] U.S. Cl. ............................ 74/812; 74/535
[51] Int. Cl.² ................................... F16H 5/52
[58] Field of Search ............ 74/812, 810, 535, 536; 254/150 R

[56] References Cited
UNITED STATES PATENTS

| | | | |
|---|---|---|---|
| 3,145,974 | 8/1964 | Short | 74/812 X |
| 3,711,065 | 1/1973 | Lawrence | 254/150 R |
| 3,802,665 | 4/1974 | Fawcett | 74/812 X |
| 3,809,368 | 5/1974 | Lawrence | 254/150 R |

*Primary Examiner*—Samuel Scott
*Assistant Examiner*—Frank H. McKenzie, Jr.
*Attorney, Agent, or Firm*—Wolf, Greenfield & Sacks

[57] ABSTRACT

A multispeed winch having a drum about which a rope or the like may be wound and a drive shaft extending through the drum which is rotatable by a winch handle. Gear trains located within the drum provide two gear ratios between the shaft and the drum. The desired gear ratio is dependent on the direction in which the handle is turned to rotate the shaft. A third, direct drive ratio is achieved by an arrangement which directly connects the winch handle to the drum.

7 Claims, 3 Drawing Figures

SHEET WINCH

BACKGROUND OF THE INVENTION

This invention relates to a sheet winch of the general type employed in a marine environment to provide a mechanical advantage in the hauling of ropes or lines in which the forces required are substantial, particularly in large sail boats. In addition to facilitating hauling of the lines by the mechanical advantage achieved, it often is important that the winch be operated as fast as possible, especially when racing such boats, where the handling of the sails as quickly as possible often is a determinative factor in the outcome of the race. In general, the requirements of providing the desired mechanical advantage and winding speed are inconsistent with each other because one must be achieved at the expense of the other. Typically, the prior multiple speed winches have employed two gear transmission ratios between the drive shaft and drum and the selection of the desired gear ratio depends on whether the winch handle (and shaft) are rotated in one direction or the other.

In some instances during the sailing of a boat, the mechanical advantage obtainable by the lowest gear ratio is less than is actually needed and it would be desirable to be able to employ a third, higher winding speed for the drum than that which can be achieved with either of the two gear transmission ratios. To this end, winches have been proposed which provide a direct drive (1:1 ratio) so that the drum can be rotated at the same angular speed as the winch handle itself.

Various devices have been proposed for achieving the direct drive. One such device has a rotatable ring at the top of the winch drum which must be manually rotated in order to effect the direct drive engagement. This type of winch can be dangerous in that the winch operator must place his fingers in the path of the rotating winch handle in order to shift the device to engage or disengage the direct drive ratio. Also, because with this device the operator must necessarily operate the winch handle with only one hand while shifting the ring, the operation of the winch is somewhat interrupted, or at least is erratic.

In another type of proposed direct drive winch, a detent is pivoted to and extends upwardly from the top of the winch drum so that it can be engaged by the winch handle. This device also requires the operator to manipulate the detent, in the path of the winch handle, and also requires him, at least for a short time period, to operate the winch handle with only one hand.

It is also desirable to employ a construction in such sheet winches in which the gearing is easily and readily accessible for maintenance, inspection or replacement. In addition, it also is desirable for such sheet winches to wear uniformly and, to that end, the construction of the rotatable mounting and bearing arrangement for the shaft and drum is an important constructional feature in such winches. It is among these objects of the invention to provide an improved sheet winch construction which achieves these objects and also provides an improved arrangement for obtaining a direct drive ratio between the winch handle and the winch drum.

SUMMARY OF THE INVENTION

The invention is employed in connection with a two speed sheet winch driven by a winch handle which rotates the shaft and, through gear trains, turns the drum at either of two speeds, depending in which direction the winch handle is rotated. The third, direct drive, speed is achieved by direct coupling of the winch handle to the drum. The direct drive coupling arrangement includes a plurality of projections on the upper end of the drum which are uniformly circumferentially spaced and define a generally castellated configuration. The winch handle carries a two position pawl which, in one position, will engage a projection to effect the direct coupling between the winch handle and the drum and a second position in which the pawl will not engage the projections, but will pass by them, as the winch handle is rotated. The two positions of the pawl are limited by an attachment which is secured to the winch handle and which engages surfaces of the pawl to define its two positions of movement. The pawl may be switched manually from one position to the other by a lever which is connected to the pawl and which is accessible on the winch handle itself. Additionally, the construction of the pawl and projections are such that when the direct driving is completed and it is desired to immediately reverse the direction of rotation of the handle to engage one of the internal gear trains, the pawl automatically is shifted to its disengaged position in response to the reversed rotation of the winch handle and before the winch handle has been rotated one complete revolution in the reverse direction.

In a further aspect of the invention, the drum is provided with an internal sleeve which fits over and surrounds an internal fixed column in the winch. Needle bearings are interposed between the sleeve and column. The upper end of the shaft protrudes through and above the upper end of the column and includes an enlarged collar which rotates within the upper end of the sleeve of the drum, a needle bearing being interposed between the collar and the upper end of the drum sleeve. This arrangement provides uniform wear and insures that the sleeve and drum will be oriented properly with respect to each other even after wear has occurred, and particularly when the drum is loaded. An additional advantage of this aspect of the invention resides in the ability of the drum to be removed easily and in its entirety and in a manner which exposes the internal transmission gears for examination, maintenance or the like.

It is among the objects of the invention to provide an improved three speed winch embodying a direct drive between the winch handle and winch drum and in which the direct drive may be engaged or disengaged manually without exposing the operator to undue risk of jamming his fingers between the handle and drum.

Another object of the invention is to provide an improved direct drive between the winch handle and winch drum.

A further object of the invention is to provide a multiple winch speed construction which is rugged, simple and enables exposure of the transmission gears for examination or maintenance in a simplified, easy manner.

DESCRIPTION OF THE DRAWINGS

The foregoing and other objects and advantages of the invention will be understood more fully from the following further description thereof, with reference to the accompanying drawings wherein.

DESCRIPTION OF THE PREFERRED EMBODIMENT

Figure 1:
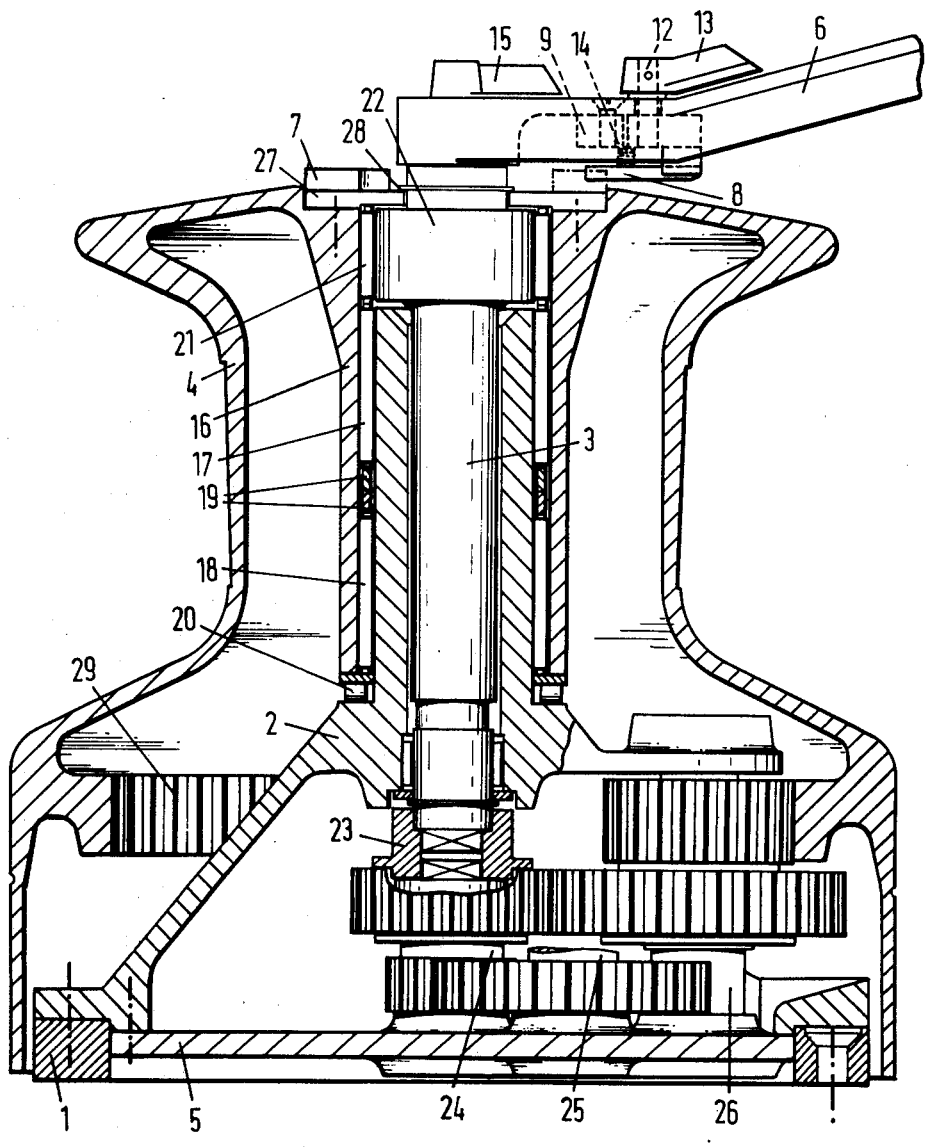
FIG. 1 is a sectional elevation of the winch.

As shown in FIG. 1, the winch includes a base ring 1 which is adapted to be securely mounted to the deck of the boat, or elsewhere on the boat as desired. An internal frame 2 which includes an upwardly extending column is mounted to the base ring 1. The drive shaft 3 extends downwardly through the column, the upper end of the drive shaft being exposed through the top of the drum and being receptive to a winch handle 6 by which the drive shaft 3 is rotated. The winch handle is provided with a polygonal projection (not shown) which is adapted to be detachably received in a corresponding recess formed in the upper exposed end of the shaft. The polygonal projection has a rotatable portion which can be operated by a knob 15 which can rotate the polygonal projection to engage or disengage an undercut portion of the recess in the upper end of the drive shaft.

The winch drum 4 includes a downwardly extending internal sleeve 16 which receives the upwardly extending column of the frame 2. The sleeve 16 and upwardly extending column are journaled with respect to each other by two needle bearings 17, 18 which are separated by spacer rings 19. A front bearing 20 also is provided at the lower end of the sleeve 16 and is disposed between the lower end of the sleeve 16 and a circumferential shoulder formed on the frame 2. The upwardly extending column portion of the frame 2 terminates well below the level of the top of the drum 4 and, near the upward end of the shaft 3, the shaft 3 is formed with an enlarged diameter collar 22 of diameter approximately equal to that of the column in which the drive shaft 3 is contained. The collar 22 is journaled directly and with respect to the upper end of the sleeve 16 by a needle bearing 21. This arrangement insures proper location of the sleeve 16 and drum 4 with respect to the shaft 3 when the drum is heavily loaded, even after the winch has been subjected to long use and has begun to wear.

The drum 4 is secured in place by an arrangement which includes a cover 27 secured to the top of the drum, the cover 27 having a hole through which the upper end of the shaft 3 may protrude to receive and be connected to the winch handle. The drum 4 is retained in place by a spring ring 28 which engages the upper end of the shaft 3 and overlies the shaft-receiving hole in the cover 27.

Figure 3:
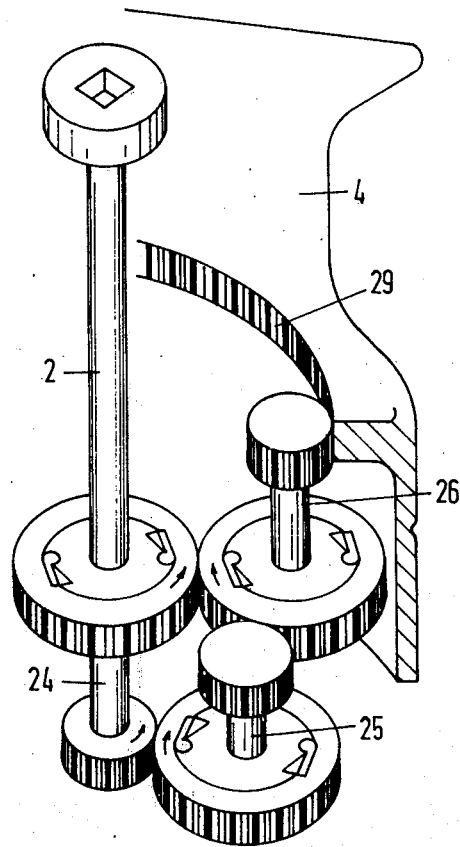
FIG. 3 is a diagrammatic perspective view of the internal gear transmissions.

The drive shaft 3 is connected to the drum by a number of gears embodying ratchet mechanisms which transmit rotation of the drive shaft 3 to an internal ring gear 29 formed integrally with or secured to the interior of the winch drum 4. As shown in FIGS. 1 and 3, the transmission gear arrangement includes three shafts 24, 25, 26 which are journaled, at their lower ends, to a base plate 5. Shaft 24 is driven by drive shaft 3 and is coupled to the drive shaft 3 by a connecting piece 23. All of the shafts 24, 25, 26 and the gears which they carry are contained within the region defined by the frame 2 and the bottom plate 5. The winch drum includes a lower skirt portion which surrounds the lower portion of the frame 2 and encloses the transmission gears. In order to expose the transmission gears for inspection, maintenance or replacement, all that need be done is to remove the winch handle and the spring ring 28 which will enable the entire winch drum 4 to be removed, thus exposing the internal gearing.

As is well known in the art, the transmission gears and ratchets are arranged so that for one direction of rotation of the handle and shaft, one gear ratio will be achieved and when the drive shaft is rotated in a reversed direction, a second gear ratio will be achieved. The transmission gearing is, of course, arranged so that the winch drum rotates in the same direction at all times in response to rotation of the drive shaft.

Figure 2:
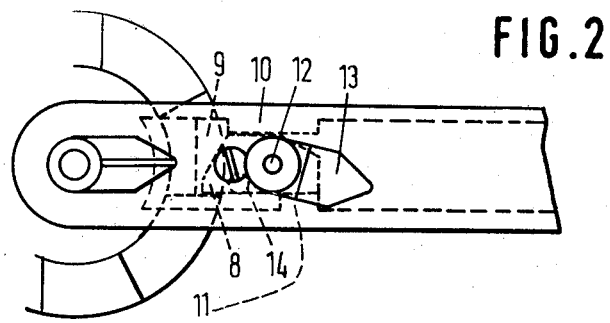
FIG. 2 is a plan view of a portion of the winch and a segment of the handle embodying the direct coupling mechanism between the handle and the drum.

As mentioned, it is desirable to provide a third, direct drive between the handle and drum to achieve a 1:1 ratio in addition to the two geared drive ratios. It may be noted that the typical two speed sheet winch employs gear transmission ratios which each are less than 1:1, so that even with the faster of the drum winding speeds available through the gearing, a full revolution of the winch drum requires more than one complete revolution of the winch handle and shaft. The direct drive is desirable in order to obtain a higher winding speed under conditions where the force which the winch must develop is not too great and does not require the increased mechanical advantages obtained by using the transmission ratios described above. To this end, the winch is provided with a plurality of lugs 7 which are secured to and extend upwardly from the cover 27. The lugs 7 are circumferentially spaced on the cover above the upper exposed end of the drive shaft 3. The winch handle 6 carries a pawl 8 which, when the handle 6 is attached to the socket in the upper end of the drive shaft 3, can be moved between two positions, selectively to engage or not engage the lugs 7. When the pawl 8 is in the lug-engaging position and is rotated clockwise (as seen in FIG. 2) the engagement of the pawl with one of the lugs 7 will directly couple the handle 6 to the drum 4, by reason of engagement of the pawl 8 with the lug 7. The rotation of the handle will continue to rotate the drum clockwise in a 1:1 ratio. As can be seen from FIG. 3, the arrangement of gears and ratchets in the gear transmission is such that when the winch is operating in the direct drive mode, the transmission gears will free wheel.

FIGS. 1 and 2 illustrate the pawl 8 in the lug-engaging position. The pawl 8 is mounted to the underside of the winch handle 6 by an attachment 9 which is secured to the underside of the handle 6 as by a screw. The attachment 9 has a pair of depending sides 10, 11 which extend downwardly to the level of the pawl 8 and which functions as stops to limit the extent to which the pawl 8 may pivot within the attachment 9. In this regard, the pawl 8 is pivotally mounted, between its ends, to but below the attachment 9 about a pin 12 which extends upwardly through the attachment 9 and through the winch handle 6 where it is secured to a selector knob 13. The selector knob 13 may be swung to its most clockwise position (shown in FIG. 2) or to its more counterclockwise position, as determined by engagement of the pawl 8 with the side 10 of attachment 9, to shift the pawl to the inoperative position. A helical spring 14 extends between the attachment 9 and the pawl 8 and is arranged to bias the pawl 8 in each of the positions thus requiring a definite force on the pawl (or the knob 13) to shift the pawl to its other position. When the pawl is pivoted about the pin 12 to its non-engaging position, the radially inwardly extending end of the pawl 8 swings out of the way (counterclockwise as seen in FIG. 2) to a position which will clear the outer periphery of the lugs 7 as the winch handle is rotated. The innermost end of the lug 7 may be beveled as shown in FIG. 2 to facilitate this clearance. As mentioned, the limit to which the pawl 8 may be pivoted (counterclockwise from the position shown in FIG. 2) is determined by engagement with the side 10 of the attachment 9 which engages the portion of the pawl 8 which extends radially outwardly beyond the pin 12.

The position of the pawl 8 may be switched manually by operation of the knob 13. Alternately, the pawl 8 may be pivoted to its non-engaging position automatically, for example, when the winch handle is rotated counterclockwise as seen in FIG. 2. When the pawl 8 is in a lug-engaging position, counterclockwise rotation of the winch handle 6 will bring the inner end of the pawl 8 into abutment with one of the lugs 7 which will urge the pawl 8 to its non-engaging position. With the pawl 8 automatically shifted to its non-engaging position, subsequent rotation of the winch handle 6 in a clockwise direction (to achieve the third gear ratio) will not be interfered with as the pawl 8 no longer will be able to engage one of the lugs 7. It may be noted that when shifting from the direct drive to the first gear ratio by imply rotating the winch handle 6 counterclockwise, the pawl 8 is shifted to the disengaged position promptly and well before a complete revolution of the winch handle 6 has occurred. Thus, should the operator decide to shift into the next gear ratio before making a complete revolution of the winch handle 6 in the second gear ratio, that will not be interfered with. And, in any event, the operator may shift the position of the pawl 8 by operating the knob 13 manually. And it should be noted that the manual operation of the knob 13 does not require the operator to take his hands off the winch handle at any time nor place his fingers in the path of movement of the winch handle.

Thus, I have described an improved winch having an improved direct drive ratio as well as a winch which can be easily assembled and disassembled and in which the internal transmission gears can be exposed easily for maintenance or the like. It should be understood, however, that the foregoing description of the invention is intended merely to be illustrative thereof and that other modifications and embodiments may be apparent to those skilled in the art without departing from its spirit.

Having thus described the invention, what I desire to claim and secure by Letters Patent is:

1. A sheet winch for multi-stage driving at different transmission ratios comprising:
    a base member;
    a winch drum for receiving a line and having formed therein an internal ring gear, said drum being disposed for rotational movement about said base member;
    a drive shaft extending through said drum;
    a gear transmission assembly connected to said drive shaft and including a drive gear for engaging said internal ring gear of said drum, said gear transmission assembly including transmission gear wheel means and pawl means for rotating said drum at different transmission ratios depending on the direction of rotation of said shaft;
    a winch handle detachably connectable to the drive shaft for rotation above the winch drum;
    a plurality of circumferentially spaced projections secured to and extending upwardly from the top of the winch drum;
    a pawl carried by the winch handle, the pawl being movable on the winch handle between a first position in which the pawl may interfere with one of said projections when the winch is rotated in one direction and a second position in which the pawl will not interfere with said projections when the winch handle is rotated in said one direction thereby to selectively enable direct coupling between said winch handle and said drum;
    said gear transmission assembly being constructed and arranged as to be free wheeling when the pawl engages said projection to drive the drum directly from the winch handle.

2. A sheet winch as defined in claim 1 further comprising:
    means biasing said pawl in whichever of said first or second positions of said pawl is disposed.

3. A sheet winch as defined in claim 1 further comprising:
    means mounting said pawl to the winch handle to automatically cause shifting of the pawl from its first position to its second position in response to rotation of the winch handle in a direction opposite to said one direction.

4. A sheet winch as defined in claim 3 further comprising:
    said circumferentially spaced projections and said pawl being further constructed as to effect said shifting of said pawl from said first to said second position before the winch handle has been rotated a complete revolution in said direction opposite to said one direction.

5. A sheet winch as defined in claim 1 further comprising:
    an attachment secured to the underside of the winch handle, said pawl being pivotally mounted to said attachment for pivotal movement about a location intermediate the ends of the pawl;
    said attachment being formed to define a pair of side portions, said side portions being located to be engaged by the pawl and to define the first and second positions of said pawl.

6. A sheet winch as defined in claim 1 further comprising:
    said base member including an upwardly extending column having an upper end located below the upper end of the winch;
    the drive shaft extending downwardly through said column, said drive shaft having an enlarged collar formed at its upper end above the upper end of the column;
    the winch drum having a downwardly extending sleeve which circumscribes the column and the enlarged collar of the shaft; and
    bearing means interposed between the drum sleeve and each of the column and collar.

7. A sheet winch as defined in claim 6 further comprising:
    the gear transmission assembly being mounted adjacent the bottom of the base member;
    the winch drum having a skirt extending downwardly below said internal ring gear and enclosing the gear transmission assembly;
    said winch drum being removable in its entirety to thereby expose the gear transmission assembly.

* * * * *